(12) United States Patent
Yamakawa et al.

(10) Patent No.: US 7,365,943 B2
(45) Date of Patent: Apr. 29, 2008

(54) THIN FILM MAGNETIC HEAD AND METHOD FOR MANUFACTURING THE SAME

(75) Inventors: Kiyoshi Yamakawa, Akita (JP); Hidetaka Yamada, Akita (JP); Shingo Takahashi, Akita (JP); Kazuyuki Ise, Akita (JP)

(73) Assignees: Japan Science and Technology Agency, Kawaguchi-shi (JP); Akita Prefecture, Akita-shi (JP)

( * ) Notice: Subject to any disclaimer, the term of this patent is extended or adjusted under 35 U.S.C. 154(b) by 0 days.

(21) Appl. No.: 11/689,818

(22) Filed: Mar. 22, 2007

(65) Prior Publication Data

US 2007/0159719 A1 Jul. 12, 2007

Related U.S. Application Data

(63) Continuation of application No. PCT/JP2005/023169, filed on Dec. 16, 2005.

(30) Foreign Application Priority Data

Dec. 16, 2004 (JP) .............................. 2004-364926

(51) Int. Cl.
*G11B 5/127* (2006.01)
(52) U.S. Cl. ..................................... 360/126
(58) Field of Classification Search ................ 360/126, 360/125, 317
See application file for complete search history.

(56) References Cited

U.S. PATENT DOCUMENTS

| | | | | |
|---|---|---|---|---|
| 5,949,624 A | * | 9/1999 | Simmons et al. ......... | 360/318.1 |
| 6,417,989 B1 | * | 7/2002 | Yang ........................... | 360/121 |
| 6,728,065 B2 | * | 4/2004 | Batra et al. ................. | 360/126 |
| 6,798,615 B1 | * | 9/2004 | Litvinov et al. ........... | 360/125 |
| 7,140,094 B2 | * | 11/2006 | Nemoto .................... | 29/603.14 |
| 7,233,457 B2 | * | 6/2007 | Johnston et al. ........... | 360/125 |
| 7,253,991 B2 | * | 8/2007 | Fontana et al. ............. | 360/126 |
| 7,295,401 B2 | * | 11/2007 | Jayasekara et al. ......... | 360/317 |
| 2001/0028530 A1 | | 10/2001 | Yoda et al. | |
| 2004/0027883 A1 | | 2/2004 | Yoda et al. | |
| 2004/0047079 A1 | | 3/2004 | Ito et al. | |
| 2005/0111138 A1 | | 5/2005 | Yamakawa et al. | |

FOREIGN PATENT DOCUMENTS

| | | |
|---|---|---|
| JP | 2000-251213 A | 9/2000 |
| JP | 2001-283411 A | 10/2001 |
| JP | 2004-030838 A | 1/2004 |
| JP | 2004-103092 A | 4/2004 |

OTHER PUBLICATIONS

Ryo Matsubara, et al., "Recording Field Analysis of a High Track Density SPT Head (2)—for various areal densities—", Technical Report of IEICE, vol. 102, No. 355, Sep. 26, 2002, pp. 9-14.

* cited by examiner

*Primary Examiner*—Angel Castro
(74) *Attorney, Agent, or Firm*—Oblon, Spivak, McClelland, Maier & Neustadt, P.C.

(57) ABSTRACT

A magnetic head has an opposite face opposite to a magnetic disk, a main pole having a distal end face and an inclined face exposed to the opposite face, and a shield yoke extended substantially facing the opposite face. An end face on which the shield yoke is opposite to the main pole via a gap is inclined substantially in parallel to the inclined face of the main pole.

9 Claims, 13 Drawing Sheets

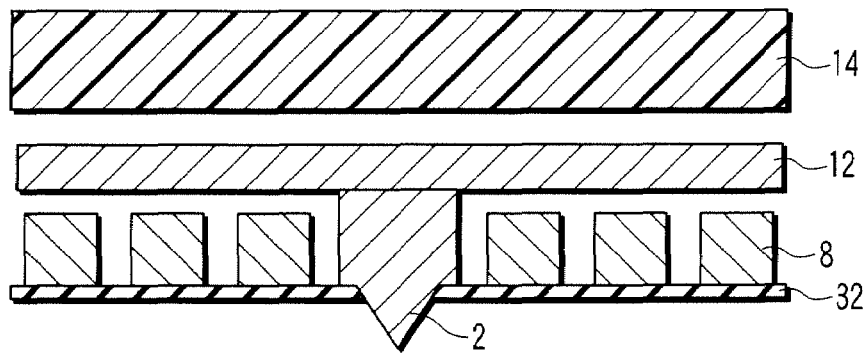
F I G. 22
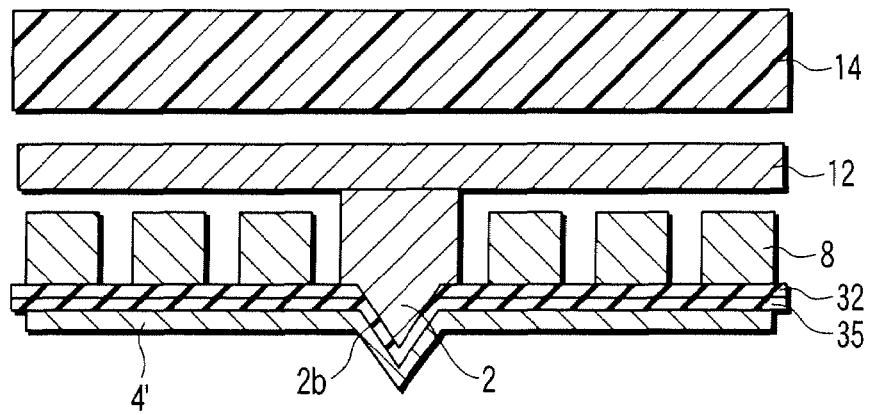
F I G. 23
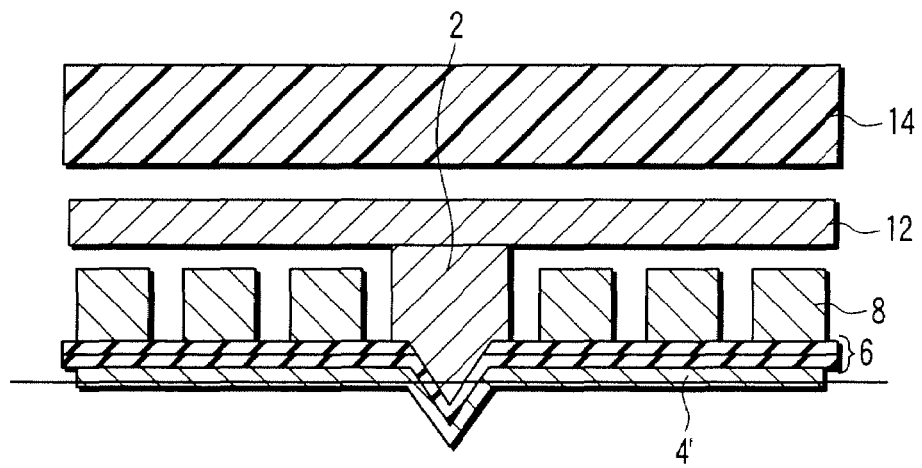
F I G. 24

THIN FILM MAGNETIC HEAD AND METHOD FOR MANUFACTURING THE SAME

CROSS-REFERENCE TO RELATED APPLICATIONS

This is a Continuation Application of PCT Application No. PCT/JP2005/023169, filed Dec. 16, 2005, which was published under PCT Article 21(2) in Japanese.

This application is based upon and claims the benefit of priority from prior Japanese Patent Application No. 2004-364926, filed Dec. 16, 2004, the entire contents of which are incorporated herein by reference.

BACKGROUND OF THE INVENTION

1. Field of the Invention

The present invention relates to a thin film magnetic head for magnetically recording information in a magnetic recording medium and a method for manufacturing the magnetic head, and particularly to a thin film magnetic head and a method for manufacturing the magnetic head incorporated in a hard disk drive (HDD) mounted in a personal computer or mobile equipment, for example.

2. Description of the Related Art

In recent years, there has been made a report based on magnetic field analysis and calculation using a finite element Method with respect to a single pole type head of which a taper is provided at a main pole and a taper is provided at a trailing side or a leading side of a return path yoke (reference should be made to non-patent document 1, for example). According to the report, it is believed that tapers are provided on the main pole and the return path yoke, thereby making it possible to enhance recording magnetic field intensity of a single pole type head.

In general, in order to enhance the recording field intensity on the single pole type head, it is believed to be effective to reduce a length in a direction distant from a magnetic recording medium of a portion at which a width in a cross-track direction of a distal end of the main pole is substantially maintained (hereinafter, referred to as a throat height TH) and to reduce a length taken along TH of a portion opposed to the main pole of a side shield (hereinafter, referred to as a shield height SH). Further, in order to enhance recording resolution, it is believed to be effective to narrowly form a gap between the main pole and the side shield.

However, at present, there is no specific report relevant to a method for manufacturing the taper and TH of the main pole, SH of the side shield, or a head capable of achieving a narrow gap as described in the above report, and a magnetic head having sufficiently satisfactory recording characteristics has not been successfully manufactured.

Non-patent document 1: Hideaki WATANABE, Yasushi KANAI, Hiroaki MURAOKA, and Yoshihisa NAKAMURA, "Technical Report of the Institute of Electronics, Information and Communication Engineers (IEICE): Analysis of Recording Magnetic Field of Vertical Magnetic Recording SPT Head Assuming Planar Density 1 Tbit/in2", Issued from the IEICE).

BRIEF SUMMARY OF THE INVENTION

It is an object of the present invention to provide a thin film magnetic recording head and a method for manufacturing the magnetic recording head that is capable of forming a steep and strong recording field and enhancing a recording density. To achieve the object, a thin film magnetic recording head according to the present invention comprises an opposite face opposite to a recording track of a magnetic recording medium; a main pole having a distal end exposed to the opposite face; a shield yoke extending the opposite face, and provided in a non-contact state via a predetermined gap on the main pole; and a coil to form a recording field which is generated at the magnetic recording medium from a distal end of the main pole; the main pole, the shield yoke, and the coil being formed to be substantially in parallel to the opposite face, wherein, in the vicinity of the distal end of the main pole, side faces at both ends in a widthwise direction of the recording track and a side face of at least one end in the recording track direction are inclined outwardly in a direction distant from the distal end.

According to the invention described above, in the vicinity of a distal end of a main pole, side faces located at both ends in a widthwise direction of a recording track and a side face located at least at one end in a recording track direction, i.e., at least three side faces of the main pole, are inclined outwardly in a direction distant from the distal end of the main pole. Thus, when information is recorded in the recording track of a magnetic recording medium, a stronger recording field can be formed by means of a magnetic charge produced at the inclined side faces.

A method for manufacturing a thin film magnetic recording head according to the present invention comprises the steps of: on a flat surface of a substrate which can be removed in accordance with chemical reaction, while forming a first hole having a first side face inclined outwardly in a direction distant from the surface and a first bottom face exposed to the surface, depositing a magnetic material to form a shield yoke as a film; on the shield yoke, while forming inside the first hole a second hole having a second bottom face from which the first bottom face of the first hole is partially exposed and a second side face that extends substantially in parallel to the inclined first side face of the first hole, depositing an insulation material to form an insulation layer; depositing a magnetic material on the insulation layer so as to embed the second hole, and then, forming a main pole having an inclined face defined by the second side face and a distal end defined by the second bottom face; forming a coil to form a recording field that is generated at a magnetic recording medium from a distal end of the main pole; forming a return yoke at an end part of the main pole which is distant from a recording medium opposite face; attaching a reinforcing member to the return yoke via a nonmagnetic insulation material; and removing the substrate.

A method for manufacturing a thin film magnetic recording head according to the present invention comprises the steps of: forming a hole having a side face inclined inwardly in a depth direction, in accordance with anisotropic etching, on a surface of a substrate composed of a single-crystal material that can be removed in accordance with chemical reaction; depositing a magnetic material on a surface of the substrate so as to embed the hole and forming a main pole having an inclined face defined by a side face of the hole; forming a coil to form a recording field that is generated at a magnetic recording medium from a distal end of the main pole; forming a return yoke at an end part of the main pole which is distant from a recording medium opposite face; attaching a reinforcing member to the return yoke via a nonmagnetic insulation material; removing the substrate; depositing an insulation material from an opposite side so as to cover an inclined face of the main pole, and then, forming an insulation layer as a film; depositing a magnetic material on the insulation layer to form a shield yoke layer; and engraving a surface of the shield yoke layer, thereby forming a flat opposite face and forming a distal end of the main pole exposed to the opposite face.

According to the invention described above, a main pole having an inclined side face and a shield yoke having an inclined end face that is opposed to the side face of the main pole via a predetermined gap can be formed in accordance with a simple process, i.e., by merely depositing and forming as a film a magnetic material or an insulation material on a surface of a substrate in an unidirectional manner; and TH of the main pole, a width of a distal end of the main pole exposed to an opposite face, SH of the shield yoke, and a gap therebetween can be formed with high dimensional precision.

BRIEF DESCRIPTION OF THE SEVERAL VIEWS OF THE DRAWING

FIG. 22 is an illustrative flow of operation for illustrating the second method for manufacturing the head of FIG. 2.

FIG. 23 is an illustrative flow of operation for illustrating the second method for manufacturing the head of FIG. 2.

FIG. 24 is an illustrative flow of operation for illustrating the second method for manufacturing the head of FIG. 2.

DETAILED DESCRIPTION OF THE INVENTION

Hereinafter, embodiments of the present invention will be described in detail with reference to the accompanying drawings.

Figure 1:
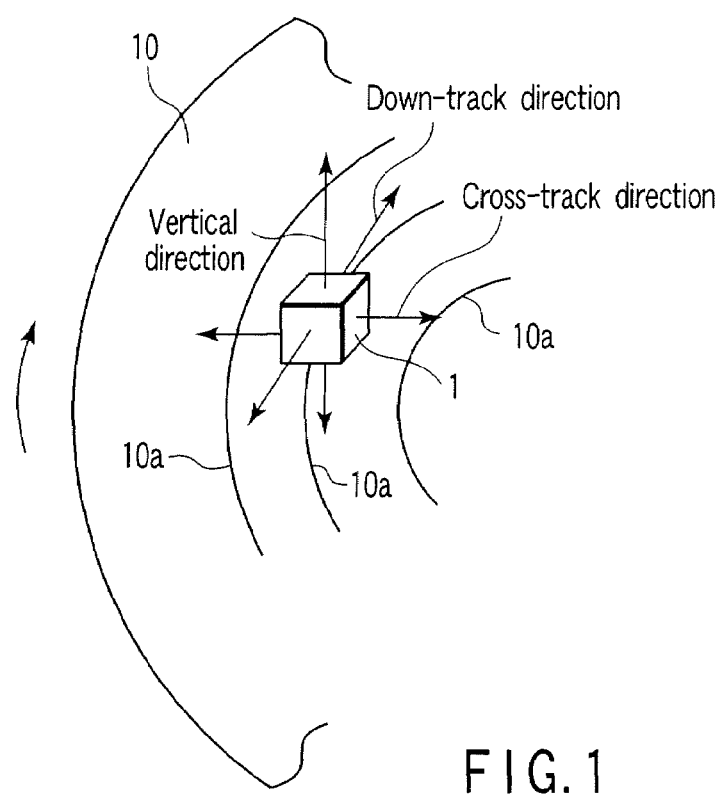
FIG. 1 is a schematic view showing a state in which a thin film single pole magnetic recording head according to an embodiment of the present invention is opposed to a magnetic disk.

FIG. 1 shows a schematic view of a so-called horizontal (planar) thin film single pole type magnetic recording head 1 (hereinafter, simply referred to as a head 1) that serves as a thin film magnetic recording head according to an embodiment of the present invention. The head 1 is provided to be movable along a surface of a magnetic recording disk 10 (hereinafter, merely referred to as a disk 10) so as to be opposed to a desired recording track 10*a* of the disk 10 that serves as a magnetic recording medium. In the following description, a direction taken along the recording track 10*a* to which the head 1 is opposed is referred to as a down-track direction; a widthwise direction of the recording track 10*a* (i.e., radial direction of the disk 10) is referred to as a cross-track direction; and a direction distant from the recording track 10*a* (disk 10) is referred to as a height direction.

Figure 2:
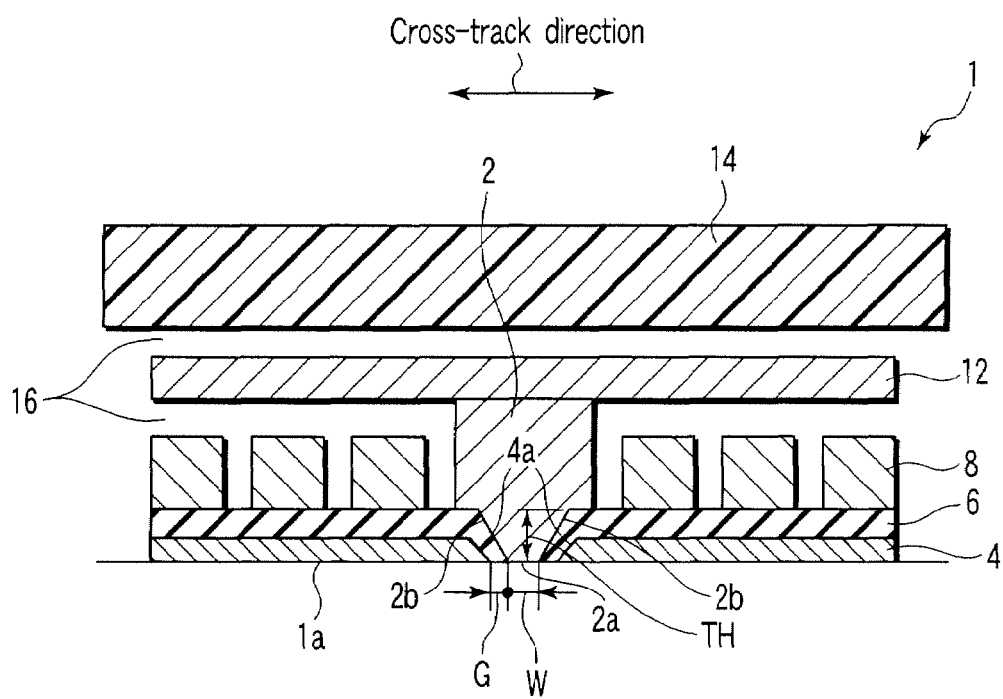
FIG. 2 is a sectional schematic view when the head of FIG. 1 is cut in a down-track direction around a main pole.

FIG. 2 shows a sectional schematic view when the head 1 is cut in the cross-track direction around a main pole 2. As shown in FIG. 2, the head 1 has an opposite face 1*a* that is opposed to the disk 10 and has a main pole 2 that has a distal end face 2*a* exposed to the opposite face 1*a*. The main pole 2 is formed of a magnetic thin film deposited in a direction distant from the distal end face 2*a* thereof. In addition, on the opposite face 1*a* of the head 1, a shield yoke 4, made of a magnetic thin film extended the opposite face 1a, is provided in a non-contact state with respect to the main pole 2 via a gap G.

At the rear side of the shield yoke 4 distant from the opposite face 1a, a nonmagnetic insulation layer 6, a coil 8, a return yoke 12, and a reinforcing member 14 are laminated sequentially in this order in a direction distant from the opposite face 1a. The insulation layer 6 defines the gas G between the main pole 2 and the shield yoke 4 and defines TH (throat height) of the main pole 2 together with the shield yoke 4. The coil 8 is formed of an electrically conductive thin film, and forms a recording field acting on the disk 10 from the distal end 2a of the main pole 2. It is also possible to employ a magnetic thin film for the coil. The return yoke 12 configures a magnetic circuit together with soft magnetic layers of the main pole 2, the shield yoke 4, and the disk 10. The reinforcing member 14 reinforces these laminate materials. Non-magnetic insulation layers 16 are provided between the coil 8 and the return yoke 12 and between the return yoke 12 and the reinforcing member 14.

The above structured head 1 is featured in that, in a TH (throat height) area in the vicinity of the distal end of the main pole 2, at least three directional side faces, i.e., a side face (not shown) located at least one of a leading side and a trailing side in a down-track direction and side faces 2b located at both sides in a cross-track direction (hereinafter, at least these three side faces are referred to as side faces 2b) are inclined outwardly in a direction distant from the distal end face 2a (opposite face 1a).

In other words, the at least three side faces 2b are inclined with respect to a normal direction of the opposite face 1a (i.e., a vertical direction) so that a cross section of the main pole extends in a direction distant from the distal end face 2a of the main pole 2. More specifically, the at least three side faces 2b are featured in that they are inclined so as to cross the opposite face 1a at an angle smaller than 90 degrees, and, in the TH area, a wall face portion extending in the normal direction of the opposite face 1a is not provided with respect to all of the side faces, excluding or including one side face in the down-track direction.

Further, end faces 4a of the shield yoke 4, opposed to the inclined side faces 2b of the main pole 2 with a predetermined gap G, are also inclined substantially in parallel to the side faces 2b. In more detail, the end faces 4a of the shield yoke 4 are inclined in parallel to, or in a direction that is gradually distant from, the side faces 2b of the main pole 2 as the end face 4a is distant from the opposite face 1a. In this manner, it becomes possible to obtain a strong recording field by means of a magnetic charge exerted on the inclined side faces 2b of the main pole 2 in the recording process. In addition, a portion of the end faces 4a proximal to the distal end part of the main pole 2 can be reduced, making it possible to promote steeping of a distribution of a recording field while restraining the lowering of the intensity of the recording field.

Figure 3:
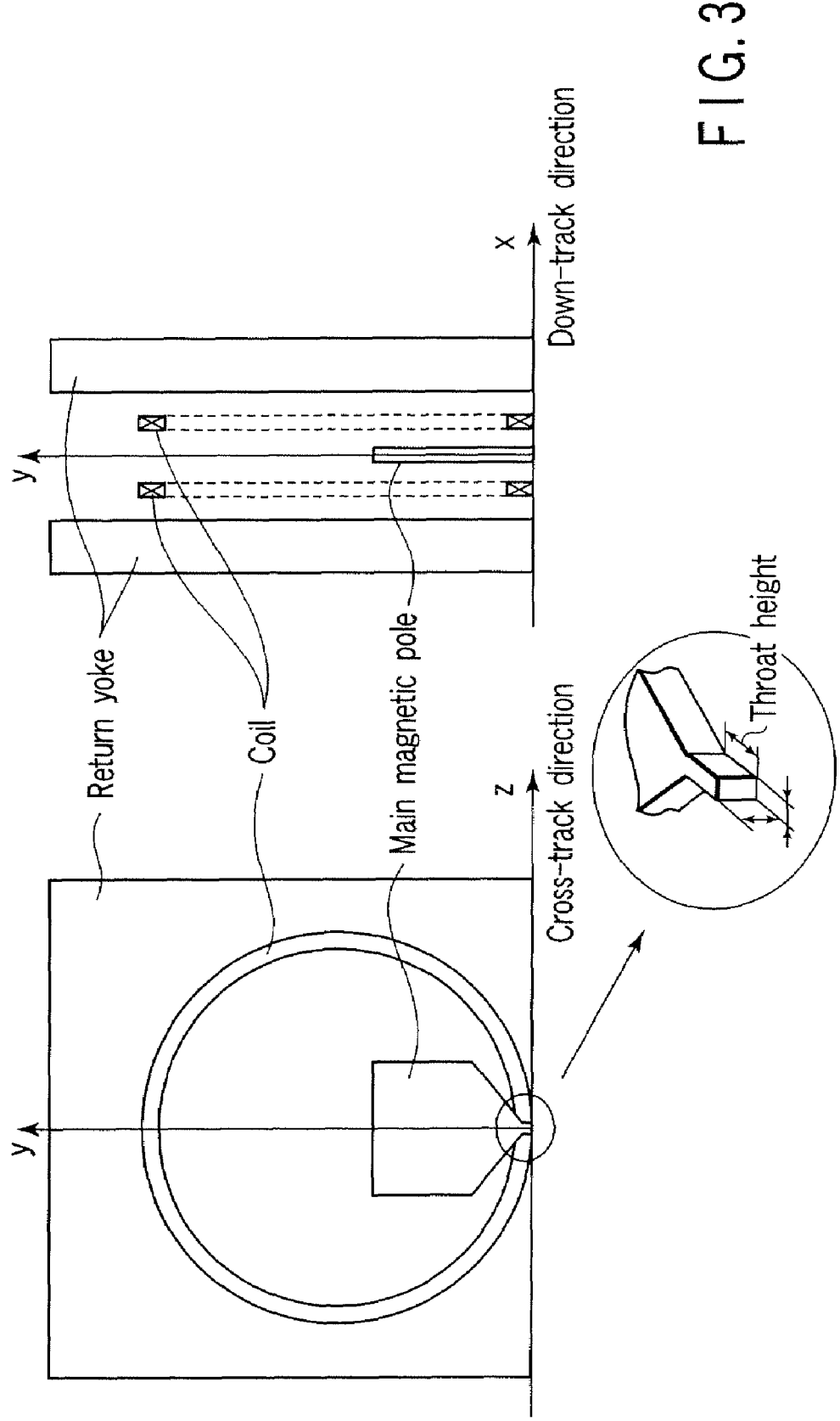
FIG. 3 is a schematic view showing a structure of a conventional thin film magnetic recording head.
Figure 4:
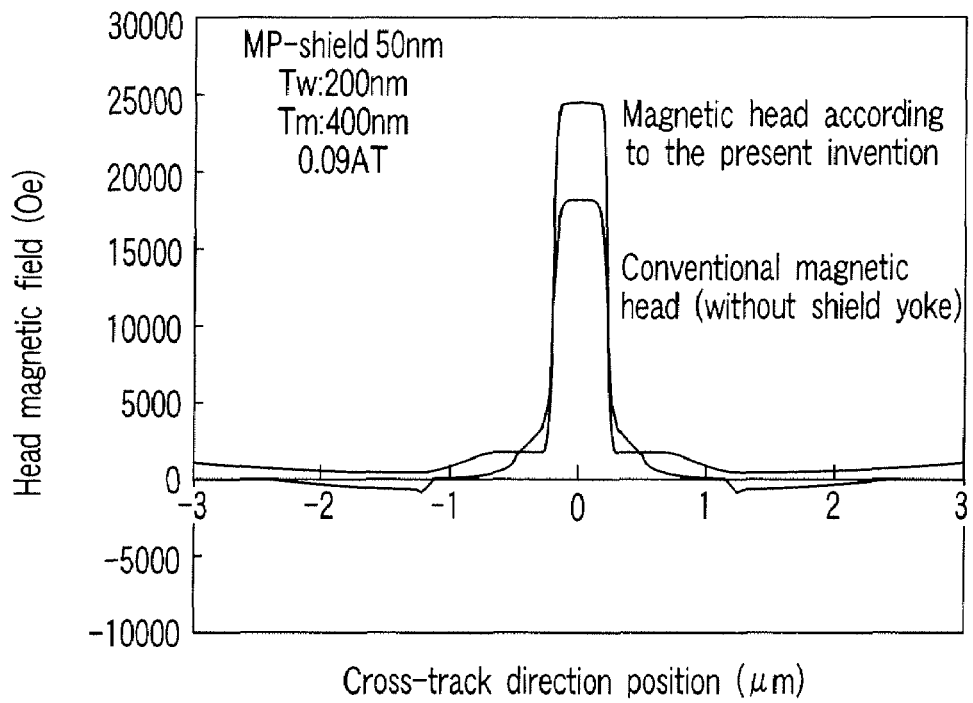
FIG. 4 is a graph showing a distribution taken along a cross-track direction of magnetic field intensity of the head in comparison between the head of the present invention of FIG. 2 and a conventional head of FIG. 3.
Figure 5:
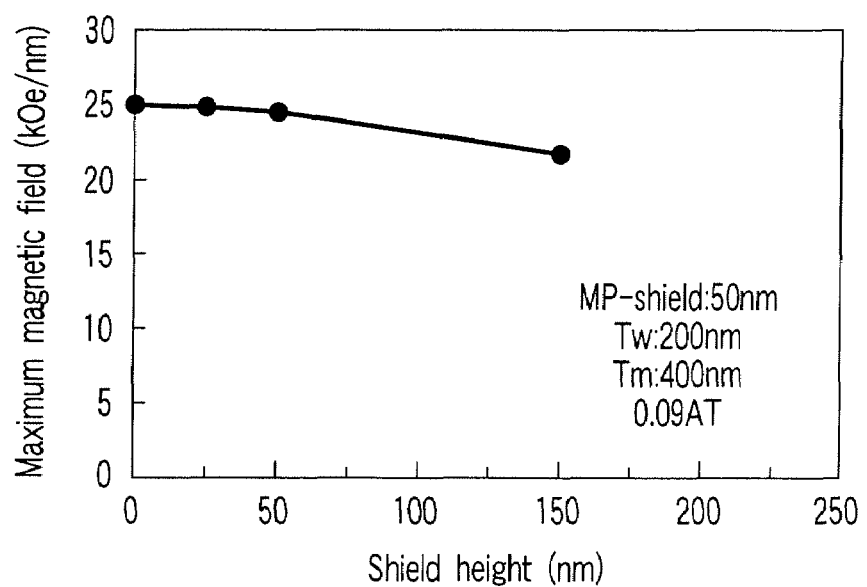
FIG. 5 is a graph depicting a relationship between height (thickness) of a shield yoke and maximum magnetic field intensity in the head of FIG. 2.

Hereinafter, characteristics of the above structured head 1 will be described in more detail in comparison with a conventionally structured thin film single pole type magnetic recording head shown in FIG. 3. The conventional head shown in FIG. 3 has a structure in which a magnetic material is deposited in a direction that is substantially parallel to a medium opposite face and no shield yoke is provided on the medium opposite face. Here, a comparative description will be given with respect to a head field based on magnetic field analysis using a three-dimensional finite element method. Results of calculation thereof are shown in FIGS. 4 and 5.

The calculation relevant to the head 1 according to the present invention was made in consideration of a soft magnetic layer of the disk 10 (not shown); and the shield yoke 4 was disposed to be opposed to all of the four faces of the main pole 2. Each of the magnetic materials was featured as follows. That is, assuming that the main pole 2, the shield yoke 4, and the return yoke 12 are made of the same material, for example, CoFe, a saturation magnetic flux density thereof was 2.4T, and a magnetic permeability was 1000. In addition, while it is assumed that the soft magnetic layer of the disk 10 is made of CoFe having the same saturation magnetic flux density as that of the main pole 2, the magnetic permeability was set at 200 in consideration of the fact that the magnetic permeability is generally designed to be set at a low value from the viewpoint of noise characteristics or disturbance resistance. In addition, a track width W of the main pole 2 (FIG. 2) was set at 200 nm; thickness of the main pole 2 (length taken along the down-track direction of the distal end face 2a in FIG. 2 and thickness of the main pole 2 in FIG. 3) was set at 400 nm; and the number of turns of the coil 8 was set at 3 turns.

If the shield yoke 4 is disposed on the opposite face 1a, like the head 1 according to the present invention, a magnetic field of the head is generally lowered. FIG. 4 shows a head field distribution taken along the cross-track direction of the head 1 according to the present invention in comparison with a conventional head that does not have a shield yoke. As shown in the figure, the head 1 according to the present embodiment is capable of obtaining large field intensity in comparison with the conventional magnetic head with no shield. It is believed that this is due to a structure in which at least three side faces 2b located in the vicinity of the distal end of the main pole 2 are inclined. While the inclined structure of the side face 2b of this main pole 2 has an action that loosens the distribution of the recording field, a steep recording field distribution is achieved by means of disposition of the shield yoke 4.

On the other hand, a design is made such that the end faces 4a of the shield yoke 4 opposite to the main pole 2 are parallel to the side faces 2b of the main pole 2 or, a length of a gap defined between opposite faces of the shield yoke 4 and the main pole 2 increases as the end face is distant from the opposite face 1a of the head 1. In this manner, although the shield yoke 4 has been disposed, it becomes possible to restrain the lowering of the recording field. Namely, an inclination is provided on the end face 4a of the shield yoke 4 that is opposite to the main pole 2, thereby making it possible to reduce an amount of the magnetic flux from the main pole 2 absorbed by the shield yoke 4 and restrain the lowering of the recording field while maintaining a shield effect.

Figure 6A:
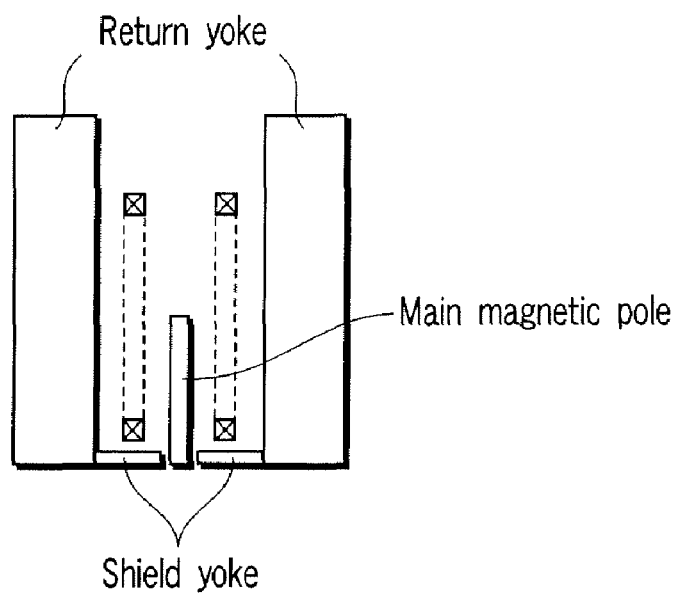
FIG. 6A is a sectional view of a structure in which a shield yoke is provided at the head of FIG. 3.
Figure 6B:
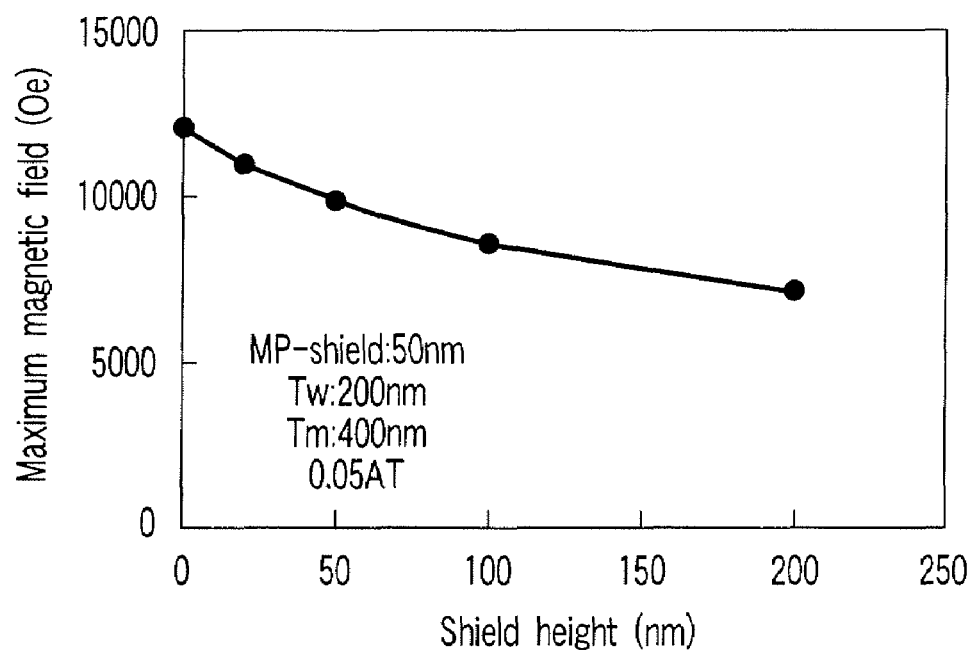
FIG. 6B is a graph depicting a relationship between height (thickness) of a shield yoke and the maximum magnetic field intensity.

While FIG. 5 shows a change of the recording field intensity in the case where the height of the shield yoke 4 (shield height and thickness of layer) has been changed, it is found that the maximum magnetic field is lowered as the height of the shield yoke 4 increases. However, as FIG. 6B comparatively shows a relationship between the height of the shield yoke and the maximum magnetic field in a head (FIG. 6A) obtained by providing a conventional head of FIG. 3 with a shield yoke, the degree of lowering of the magnetic field is small in comparison with that of the conventional recording head. This fact can be said to be advantageous in terms of manufacturing because height precision required for the shield yoke 4 of the recording head according to the present embodiment is comparatively loose.

Here, the return yoke 12 of the head 1 according to the present invention will be discussed.

Figure 7:
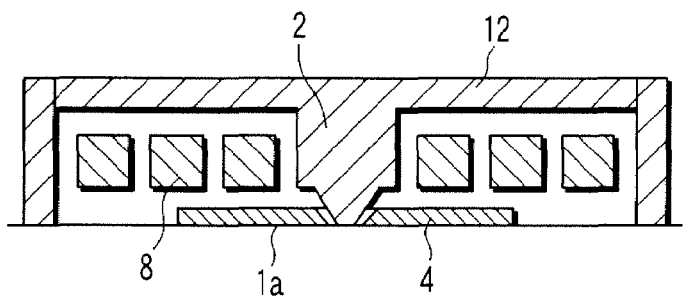
FIG. 7 is a sectional schematic view showing a modified example in which a return yoke of the head of FIG. 2 is changed in shape.

In the return yoke 12, as described above, a magnetic circuit is made of the main pole 2 and the soft magnetic layer of the disk 10. Thus, the return yoke 12 is generally extended up to the opposite face 1a opposite to the disk 10 so that the magnetic circuit is closed. Therefore, as a type of the return yoke 12, in addition to the return yoke structure shown in FIG. 2, it is possible to provide a closed magnetic path type return yoke that configures a closed magnetic path while the return yoke 12 extends up to the opposite face 1a, as shown in FIG. 7. The return yoke 4 of FIG. 2 does not always need to be parallel to the opposite face 1a, and is typically provided as an open magnetic path type return yoke in which one end is disposed at a position distant from the opposite face 1a.

Figure 8:
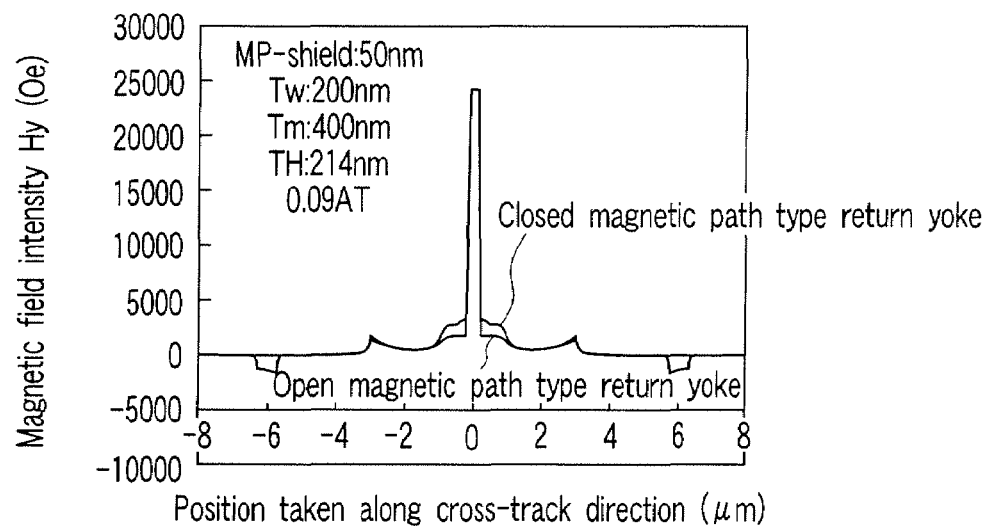
FIG. 8 is a graph depicting a distribution taken along a cross-track direction of magnetic field intensity of the head in comparison between a head having an open magnetic path type return yoke of FIG. 2 and a closed magnetic path type return toke of FIG. 7.

FIG. 8 graphically depicts a distribution of recording field intensity taken along a cross-track direction of a head having an open magnetic path type return yoke and a head having a closed magnetic path type return yoke. In addition, FIG. 9 graphically depicts a relationship between the maximum recording field intensity and a coil current in the vicinity of a main pole of each head. Further, FIG. 10 graphically depicts a relationship between recording field intensity and a coil current exerted by a return yoke at a position at which a closed magnetic path type return yoke is the most proximal to the opposite face 1a in comparison between the heads.

Figure 9:
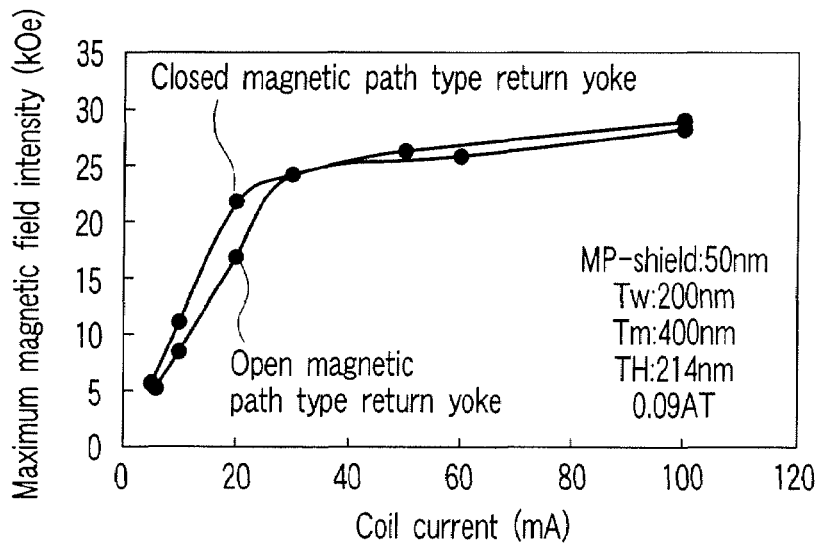
FIG. 9 is a graph depicting a relationship between a coil current and the maximum recording field intensity in comparison between the head of FIG. 2 and the head of FIG. 7.
Figure 10:
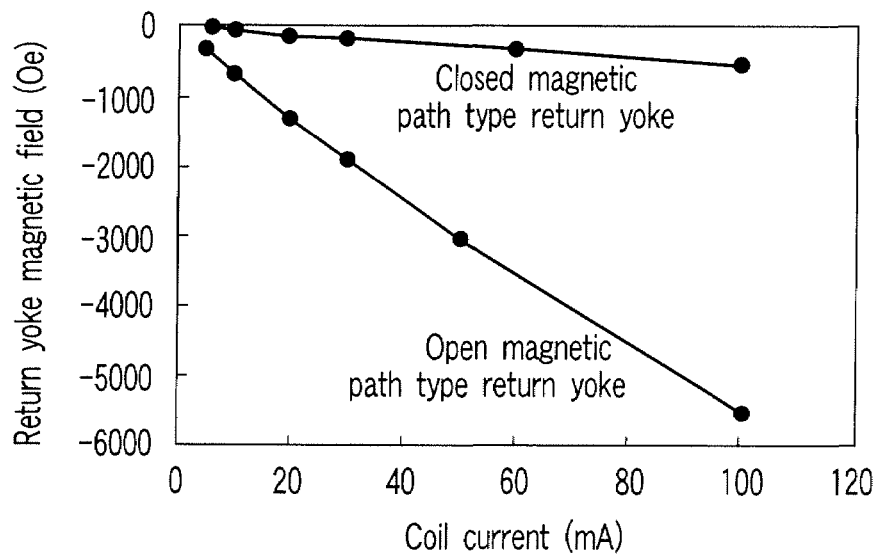
FIG. 10 is a graph depicting a relationship between a magnetic field and a coil current exerted by a return yoke at a site at which the return yoke is the most proximal to an opposite face in comparison between the head of FIG. 2 and the head of FIG. 7.

As shown in FIG. 9, in the closed magnetic path type return yoke shown in FIG. 7, a closed magnetic circuit is configured as described above, and thus, sensitivity relevant to a coil current of the maximum recording field intensity is high in comparison with the open magnetic path type return yoke shown in FIG. 2. However, as is evident from FIG. 8, in the closed magnetic path type return yoke, the recording field intensity exerted by the return yoke 12 is strong at a portion at which the return yoke 12 is the most proximal to the opposite face 1a, and the recording field exerted by the return yoke 12 increases with the coil current, as shown in FIG. 10. This recording field can cause problems such as erase of a recording signal or promotion of thermal disturbance.

On the other hand, the open magnetic path type return yoke as shown in FIG. 2 has a desirable structure in which the magnetic field produced by the return yoke 12 is sufficiently small at the same portion. In order to prevent such an undesirable magnetic field from being formed by the return yoke 12, there is no need for the return yoke 12 to be horizontal as described above. A portion at which the return yoke 12 is the most proximal to the disk 10 may be distant from the soft magnetic layer of the disk 10 at least by thickness of the return yoke 12.

Now, a first method for manufacturing the above structured head 1 will be described with reference to FIGS. 11 to 16.

Figure 11:
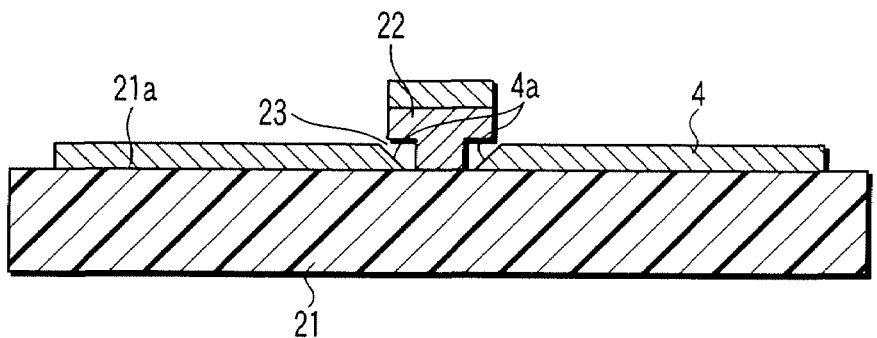
FIG. 11 is an illustrative flow of operation for illustrating a first method for manufacturing the head of FIG. 2.

First, as shown in FIG. 11, a photoresist pattern 22 for forming an inclined end face 4a (first end face) of a shield yoke 4 is formed on a flat surface 21a of a substrate 21 (substrate) made of a material such as Si that can be selectively removed in accordance with chemical reaction. The photoresist pattern 22 is formed in a sectional substantial T shape or in a substantially inverted trapezoidal shape such that a portion close to the surface 21a is thinly formed.

Then, a magnetic material such as CoFe is formed as a film from above this photoresist pattern 22 in accordance with a sputtering technique or the like, and an unnecessary portion on the photoresist pattern 22 is removed by means of a lift-off technique, thereby forming the shield yoke 4. An inclination angle of the end faces 4a of the shield yoke 4 can be controlled depending on the shape of the photoresist pattern 22 or the film forming condition. In another point of view, after eliminating an unnecessary portion including the photoresist pattern 22, a bottom face (first bottom face) from which the surface 21a of the substrate 21 is exposed and a hole 23 (first hole) having the end faces 4a are formed in a shield yoke layer.

Figure 12:
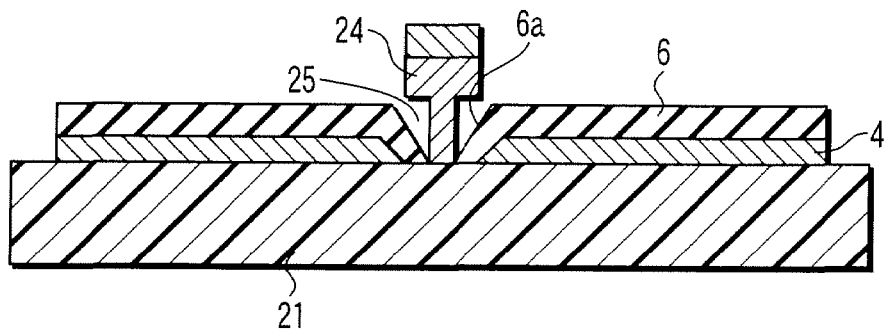
FIG. 12 is an illustrative flow of operation for illustrating the first method for manufacturing the head of FIG. 2.

Next, as shown in FIG. 12, a photoresist pattern 24 for forming as a film an insulation layer 6 that functions as a gap layer between the main pole 2 and the shield yoke 4 is formed at a substantial center the hole 23. In order to form a small diameter hole 25 inside of the hole 23 described above, this photoresist pattern 24 is also formed in a sectional T shape or in an inverted trapezoidal shape. Then, after a nonmagnetic insulation material such as $Al_2O_3$ is formed as a film from above this photoresist pattern 24, an unnecessary portion is removed from the resist by means of a lift-off technique, and then, the insulation layer 6 serving as a gap layer is formed. At this time, on the insulation layer 6, there is formed a hole 25 (second hole) having a bottom face (second bottom face) from which the bottom face of the hole 23 described above is partially exposed and a side face of the hole 23 described above, i.e., a side face 6a (second side face) extended substantially in parallel with the end face 4a of the shield yoke 4. An inclination angle of the side face 6a of this hole 25 can also be controlled by means of adjusting the shape of the photoresist pattern 24, film forming condition and the like.

Figure 13:
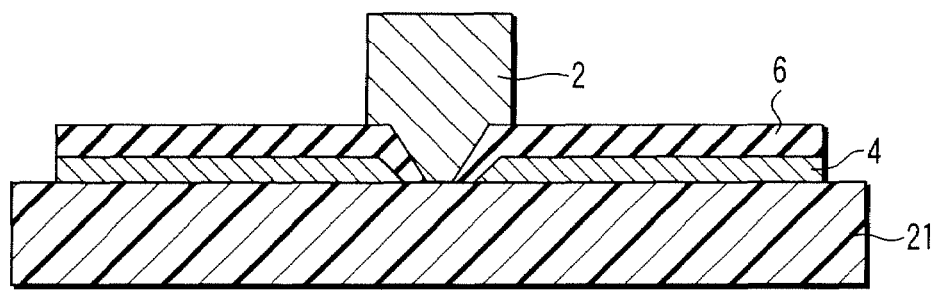
FIG. 13 is an illustrative flow of operation for illustrating the first method for manufacturing the head of FIG. 2.

Further, a magnetic material such as CoFe is deposited and a magnetic thin film is formed so as to embed the above hole 25. Then, a main pole 2, having an inclined face 2b defined by the side face 6a of the above hole 25 and the distal end face 2a defined by the bottom face of the hole 25, is formed (FIG. 13).

Figure 14:
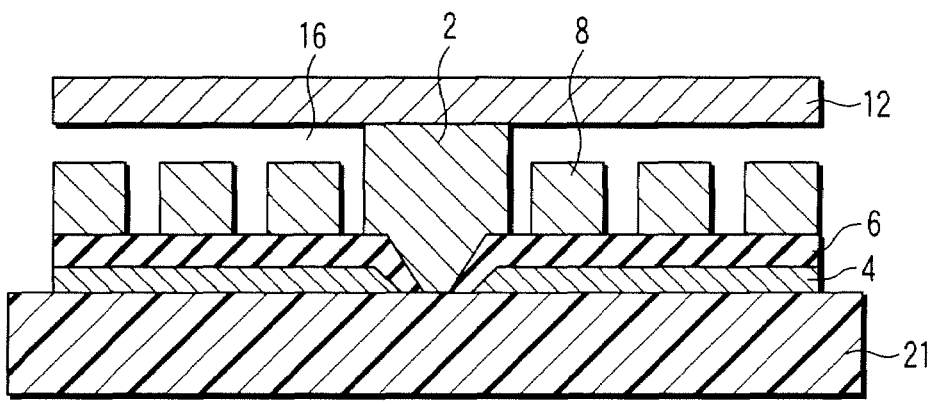
FIG. 14 is an illustrative flow of operation for illustrating the first method for manufacturing the head of FIG. 2.
Figure 15:
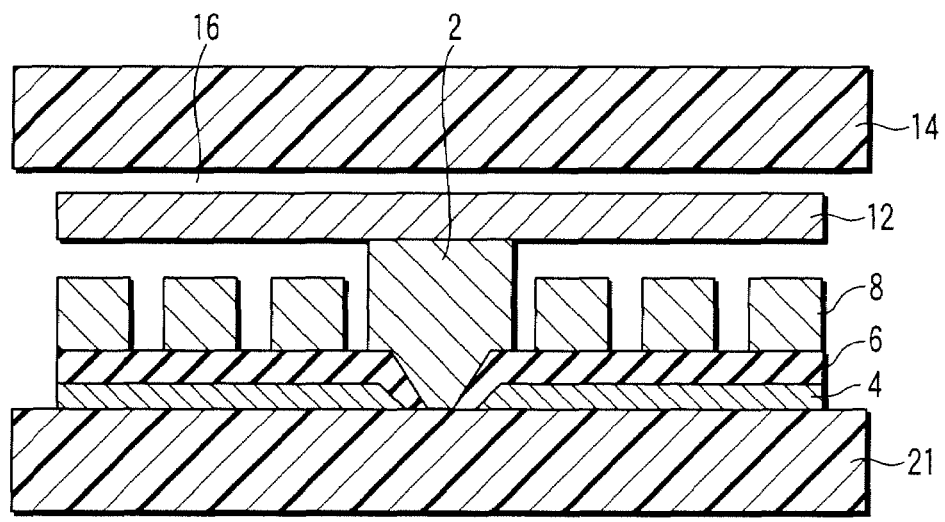
FIG. 15 is an illustrative flow of operation for illustrating the first method for manufacturing the head of FIG. 2.

Then, as shown in FIG. 14, a coil 8 surrounding the main pole 2 is formed from an electrically conductive thin film, and then, a return yoke 12 is formed via an insulation layer 16. Further, as shown in FIG. 15, the reinforcing member 14 is then attached via the insulation layer 16. Specifically, polishing for flattening the insulation layer 16 is properly carried out, and a reinforcing member 14 such as a glass or ceramics (serving as a slider substrate later) is attached to this flat face.

Figure 16:
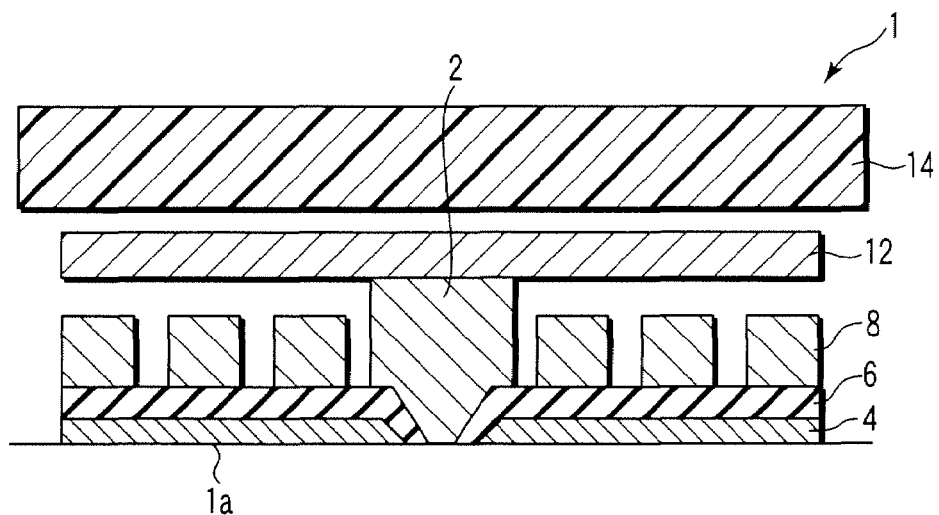
FIG. 16 is an illustrative flow of operation for illustrating the first method for manufacturing the head of FIG. 2.

Lastly, as shown in FIG. 16, the substrate 21 having a variety of thin films deposited thereon is selectively removed using a solution such as potassium hydroxide (KOH) or hydroxide (TMAH), whereby an opposite face 1a opposite to the disk 10 is completed. Then, air bearing surface pattern and a protective film such as diamond-like carbon (DLC) are formed on the opposite face 1a, although not shown.

As described above, according to the first manufacturing method, the shape or film forming method of the photoresist pattern 22 is contrived, thereby making it possible to control an inclination angle of the end face 4a of the shield yoke 4. Further, the shape or film forming method of the photoresist pattern 24 is contrived, whereby an inclination angle of the inclined face 2b of the main pole 2 can be controlled. In addition, according to the first manufacturing method, TH (throat height) of the main pole 2 or SH (shield height) of the shield yoke 4 depend on film thickness of the shield yoke 4 or film thickness of the insulation layer 6, thus making it possible to control these dimensions to be equal to or smaller than 100 nm. Further, according to the first manufacturing method, the track width W of the distal end face 2a from which the main pole 2 is exposed to the opposite face 1a can be easily controlled, making it unnecessary to carry out another processing after forming the main pole 2 as a film.

Now, a second method for manufacturing the above structured head 1 will be described with reference to FIGS. 17 to 26.

Figure 17:
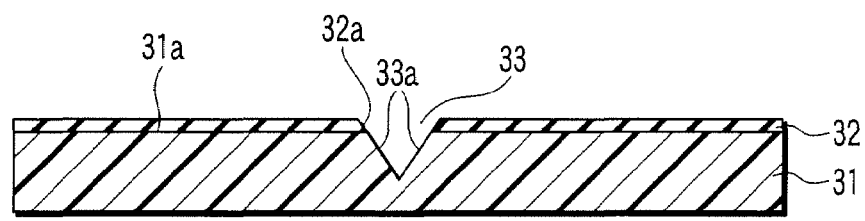
FIG. 17 is an illustrative flow of operation for illustrating a second method for manufacturing the head of FIG. 2.

First, as shown in FIG. 17, an oxide layer 32 or a nitride layer 32 functioning as a mask member is provided on a surface 31*a* of a substrate 31 (substrate) composed of a single-crystal Si material that can be removed in accordance with chemical reaction. Then, this mask layer 32 is etched using a solution such as fluoric acid (HF) or phosphorous acid ($H_3PO_4$), and then, an opening 32*a* is formed. The shape of the opening 32*a* is designed based on the shape of the main pole 2 described later.

Then, the substrate 31 is anisotropy-etched using a solution such as KOH or TMAH via the opening 32*a* of this mask layer 32. As a result, in the case of a (100) substrate, a groove 33 (hole) is formed as having a side face 33*a* inwardly inclined in a depth direction by about 55 degrees. In the above described process, the angle changes depending on a substrate face orientation or an in-plane orientation. In addition, it is possible to utilize a single-crystal other than Si such as GaAs or quartz, for example. In addition, anisotropic etching by reactive ion etching (RIE) using a gas can also be carried out.

Figure 18:
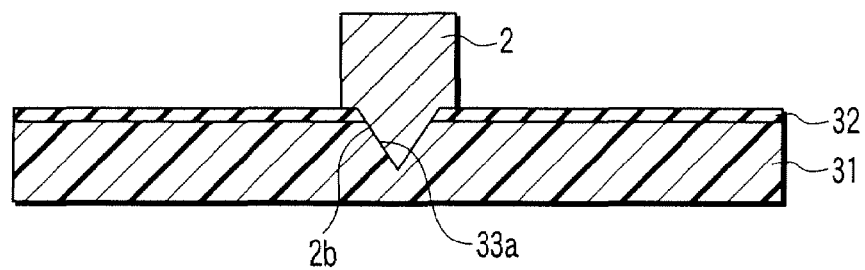
FIG. 18 is an illustrative flow of operation for illustrating the second method for manufacturing the head of FIG. 2.
Figure 26:
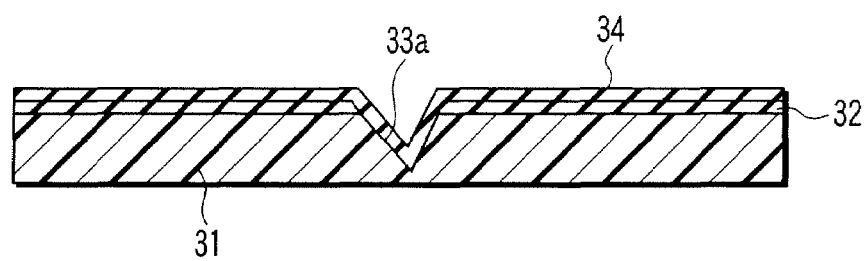
FIG. 26 is an illustrative flow of operation for illustrating the second method for manufacturing the head of FIG. 2.

Then, as shown in FIG. 18, a magnetic material such as CoFe is formed as a film on the surface 31*a* of the substrate 31 so as to embed the groove 33 formed as described above, and then, a main pole 2 is formed. An inclination face 2*b* of the thus formed main pole 2 is defined by an inclined side face 33*a* of the anisotropy-etched groove 33 to have an inclination angle of about 55 degrees. Before forming the magnetic material of the main pole 2 as a film, it is possible to provide, as a protective film, an oxide layer 34 or a nitride layer 34 as shown in FIG. 26 inside the groove 33, and use the protective film for protection of the main pole 2 at the time of removing the substrate 31 in a later process.

Figure 19:
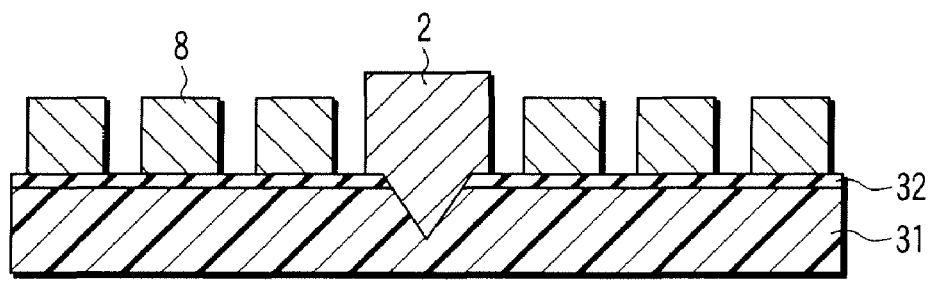
FIG. 19 is an illustrative flow of operation for illustrating the second method for manufacturing the head of FIG. 2.
Figure 20:
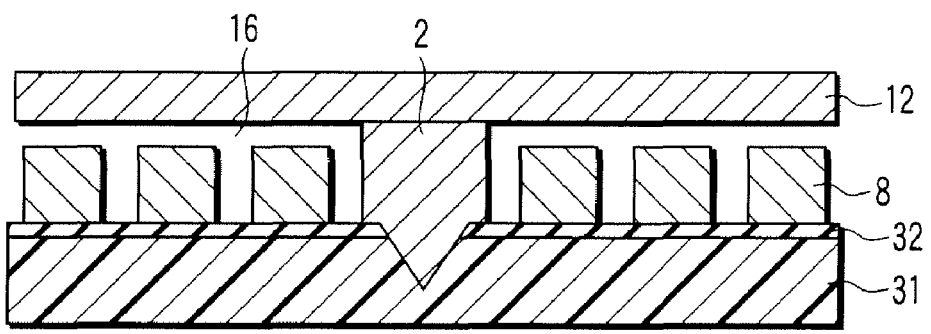
FIG. 20 is an illustrative flow of operation for illustrating the second method for manufacturing the head of FIG. 2.
Figure 21:
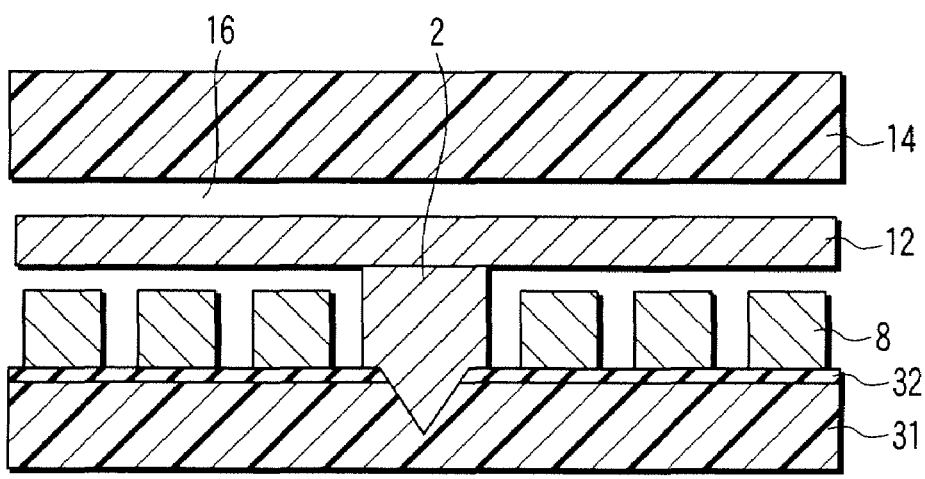
FIG. 21 is an illustrative flow of operation for illustrating the second method for manufacturing the head of FIG. 2.

After forming the main pole 2 as described above, a coil 8 made of an electrically conductive thin film is formed as a film around the main pole 2, as shown in FIG. 19. Then, a return yoke 12 is formed as a film via an insulation layer 16, as shown in FIG. 20. Thereafter, as shown in FIG. 21, polishing for flattening of the insulation layer 16 is properly carried out via the insulation layer 16, and then, a reinforcing member 14 such as a glass or ceramics (serving as a slider substrate later) is attached to this face.

Then, as shown in FIG. 22, the substrate 31 having a variety of thin films deposited thereon is selectively removed using a solution such as KOH or TMAH. In this state, a face on which a mask layer 32 comes into planar contact with the substrate 31 and a tapered distal end of the main pole 2 are exposed. Then, as shown in FIG. 23, from the distal end side of the thus exposed main pole 2, i.e., from the opposite side to a side deposited up to now, an insulation material is deposited so as to cover the inclined face 2*b* of the main pole 2 to form an insulation layer 35 as a film, and then, a magnetic material is deposited to be superimposed on this insulation layer 35 to form a shield yoke layer 4' as a film. The mask layer 32 and the insulation layer 35 described above function as the insulation layer 6 described above, and then, the shield yoke layer 4' configures the shield yoke 4 in a next process.

Figure 25:
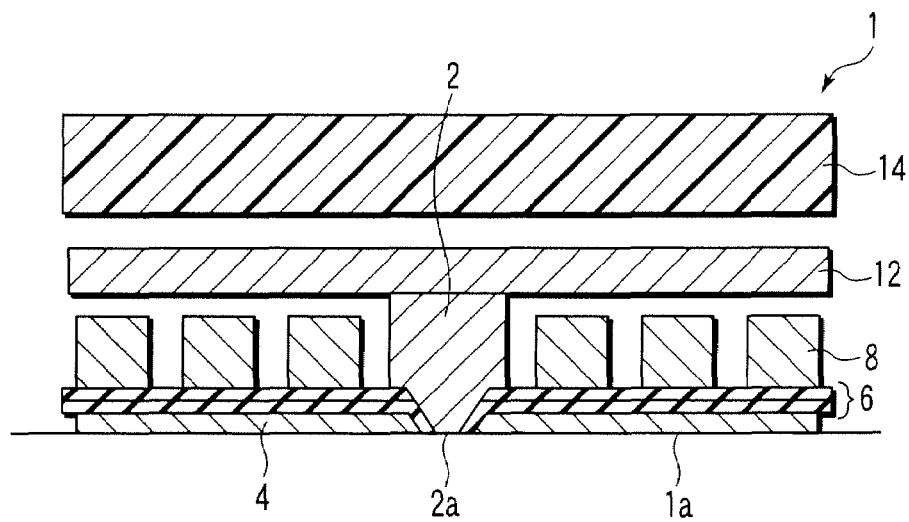
FIG. 25 is an illustrative flow of operation for illustrating the second method for manufacturing the head of FIG. 2.

Lastly, as shown in FIG. 24, the shield yoke layer 4', the insulation layer 35, and the main pole 2 are polished or etched by means of an etch-back technique so that the distal end face 2*s* of the main pole 2 is exposed to the opposite face 1*a* at desired dimensions, and then, the opposite face 1*a* opposite to the disk 10 is formed as shown in FIG. 25. Then, air bearing surface pattern and a protective film such as diamond-like carbon (DLC) are formed on the opposite face 1*a*, although not shown.

As described above, according to the second manufacturing method, there can be attained an advantageous effect that is similar to that attained according to the first manufacturing method described above. In addition, a groove 33 having a predetermined angle can be easily formed utilizing anisotropic etching of a single-crystal material, and the inclined face 2*b* of the main pole 2 can be formed more easily.

Namely, according to the two manufacturing methods described above, the insulation layer 6 or the shield yoke 4 that defines a gap G between the main pole 2 and the shield yoke 4 can be fully formed by means of thin film deposition in the same direction, thus making it possible to fabricate the insulation layer 6 and the shied yoke 4 described above with higher precision in comparison with a conventional manufacturing method. In addition, on the inclined face 2*b* of the main pole 2, a magnetic film is deposited and formed along the surface shape of the nonmagnetic layer deposited on the shield yoke 4 described above or the groove 33 formed on the substrate 31. Thus, the inclined face 2*b* inclined in the normal direction of the opposite face 1*a* is formed in a self-organized manner. As a result, the shape of the main pole 2 capable of producing a strong field can be easily provided with high precision.

Figure 27:
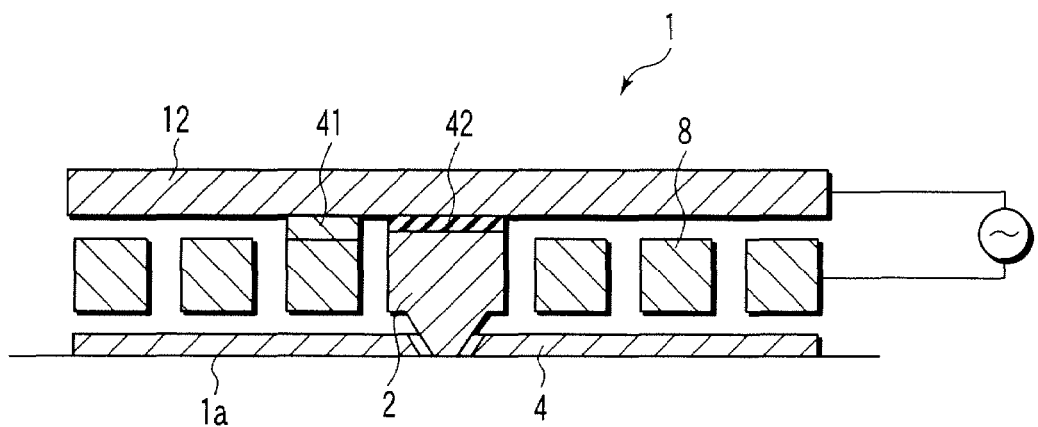
FIG. 27 is a sectional schematic view showing a wiring structure of a coil of the head of FIG. 2.

In the meantime, in the case where the planar head 1 described above has been configured, there is a need for making contrivance for wiring to supply power to the coil 8. FIG. 27 illustrates a wiring structure of the coil 8 in the head 1 described above.

With this structure, an internal circumferential end part of the coil 8 and the return yoke 12 are electrically connected to each other via an electrically conductive member 41, and a current is applied to the coil 8 through the return yoke 12. In this case, there is a need for providing a gap between the main pole 2 and the return yoke 12 in order to preclude power supply to the disk 10 through the main pole 2.

Figure 28:
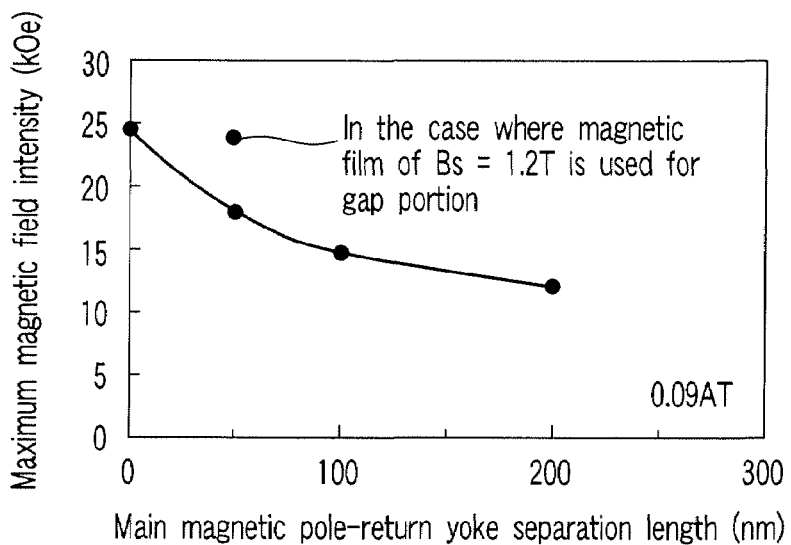
FIG. 28 is a graph depicting a relationship between, a gap between a main pole and a return yoke of the head of FIG. 27, and maximum magnetic intensity and depicting the maximum recording field intensity in the case where a gap is charged with a high resistance member.

FIG. 28 shows a relationship between a gap (separation length) between the main pole 2 and the return yoke 12 and the maximum recording field intensity. According to this relationship, there is a need for the gap to be narrower than at least 100 nm in order to prevent significant lowering of recording sensitivity. In addition, there is no need for charging the gap with a complete insulation material, and it is sufficient if a high resistance member 42 (FIG. 27) is charged, the member having a resistance that is sufficiently as large as the order of several kΩ. For example, a high resistance magnetic film such as CoFe—$Al_2O_3$ is charged in the gap, whereby a ferromagnetic field can be produced with high sensitivity, as shown in FIG. 28.

Now, the main pole 2 of the head 1 according to the present embodiment will be described in more detail. While the following description will be given with reference to a structure in which an inclined face 2*b* is not provided in the vicinity of a distal end of the main pole 2, this also applies to the main pole 2 having the inclined face 2*b* as in the embodiment described above.

In recent years, a track width of a magnetic recording head has been reduced in order to cope with higher density. Concurrently, a ratio of a dimension (TH: throat height) in a direction (vertical direction) orthogonal to a medium opposite face at a distal end part of the main pole to a dimension (track width or thickness of main pole) relevant to a medium opposite face in-plane direction has increased, thereby increasing the shape magnetic anisotropy in the vertical direction of the portion. As a result, the residual magnetization occurs in the vertical direction exerted by disturbance of a magnetic domain structure. In this manner, problems such as erasure of signal magnetization on a recording layer of a magnetic recording medium or promotion of thermal disturbance has substantiated. As one of the solutions to this problem, reduction of the throat height is generally expected. However, it is impossible to cope with higher density in the future from the viewpoint of precision by a polishing process that has been employed so far.

Figure 29:
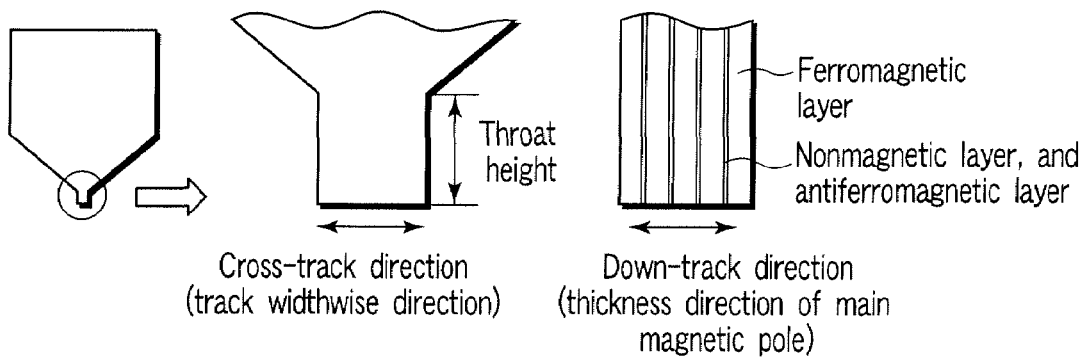
FIG. 29 is a view showing a main pole having a conventional laminate structure.

Therefore, as anther solution to the above problem, as shown in FIG. 29, there is generally known a method for alternately laminating a ferromagnetic layer made of a main pole material and a nonmagnetic layer or an antiferromagnetic layer, or a combination thereof in the film thickness direction (deposition direction) of the main pole to form the main pole. However, this method entails a problem that recording field intensity is lowered in accordance with a ratio in square area of the nonmagnetic material or the antiferromagnetic material exposed to the medium opposite face of the main pole.

Thus, in the present embodiment, in view of the circumstance described above, a main pole structure illustrated in FIG. 30 has been employed. Specifically, in the vicinity of a distal end of the main pole 2, the main pole 2 was formed by alternately laminating a nonmagnetic 51 (first layer) including at least one of a nonmagnetic material and an antiferromagnetic material and a ferromagnetic layer 52 (second layer) including a ferromagnetic material in a direction distant from an opposite face 1a opposite to a magnetic recording medium (disk 10). A ferromagnetic layer 52 is disposed at a distal end of the main pole 2, i.e., on a face opposite to the disk 10. By employing this structure, reduction of a recording field can be restrained without the nonmagnetic material or the antiferromagnetic material being exposed to the medium opposite face of the main pole 2.

Figure 30:
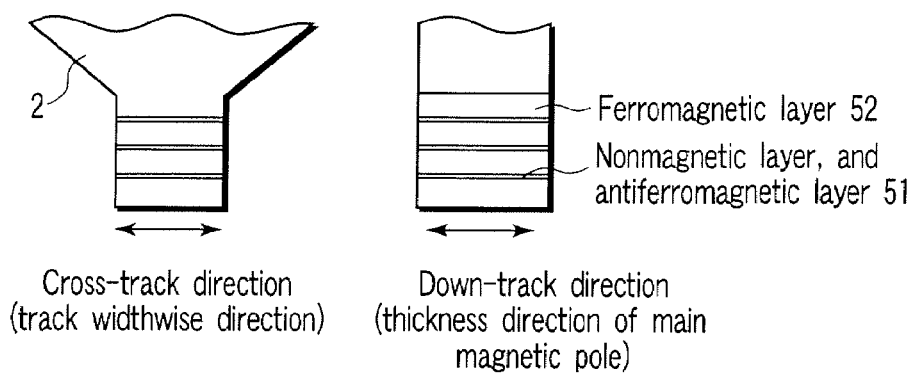
FIG. 30 is a view showing a main pole having a laminate structure according to the present embodiment.
Figure 31:
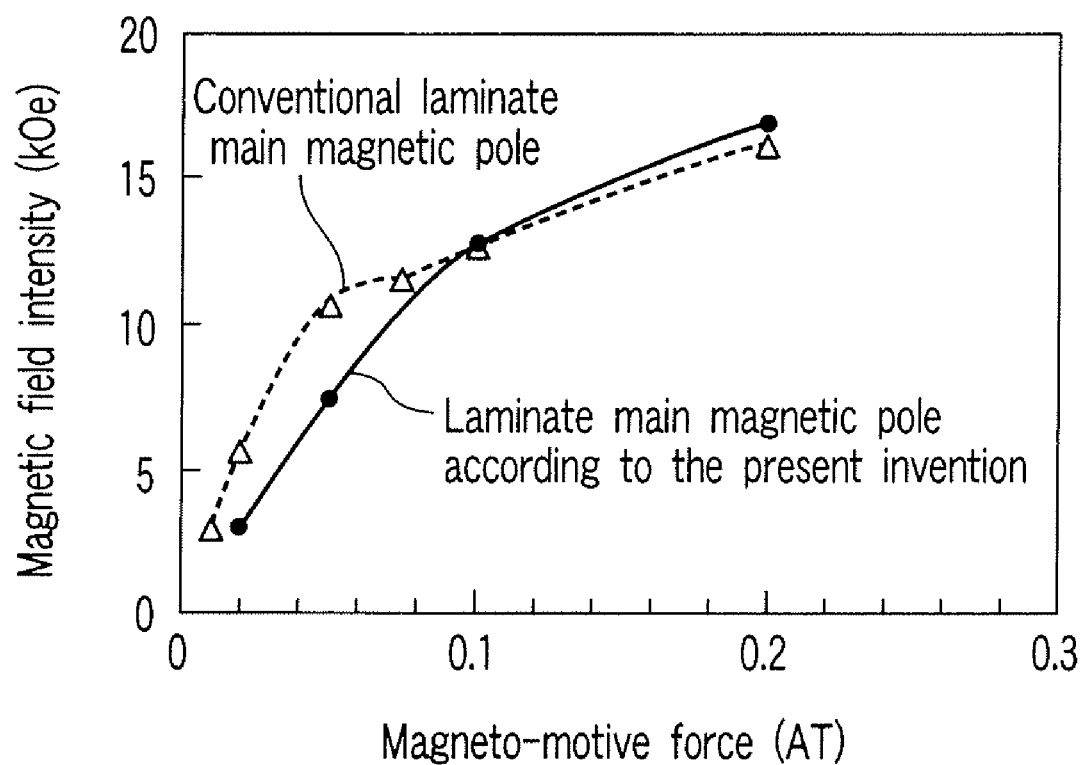
FIG. 31 is a graph depicting a relationship between magneto-motive force and recording field intensity in comparison between a head provided with a main pole of FIG. 29 and a head provided with a main pole of FIG. 30.

FIG. 31 shows a relationship between a magneto-motive force and recording field intensity while comparing a main pole of a structure illustrated in FIG. 29 and the main pole 2 of the present invention of a structure shown in FIG. 30. Here, assuming that thickness of each ferromagnetic layer 52 is 40 nm, and a nonmagnetic layer having thickness of 10 nm is employed as the non-ferromagnetic layer 51, computation was carried out in accordance with a three-dimensional finite element method. In this computation, a track width W of the distal end face 2a of the main pole 2 was set at 200 nm, thickness of the main pole 2 was set at 400 nm; and throat height was set at 200 nm. In this case, the number of nonmagnetic layers 51 to be laminated becomes 7 layers in the main pole of FIG. 29 and becomes three layers in the main pole 2 according to the present invention of FIG. 30.

In the main pole 2 according to the present invention, a demagnetizing field in a direction distant from the opposite face described above is intentionally increased, thus requiring a comparatively large magneto-motive force to obtain a predetermined recording field. However, in the case of this example of computation, it is possible for the main pole according to the present invention to obtain a magnetic field that is stronger than that of a main pole of a conventional structure at an magneto-motive force equal to or greater than 0.1 AT. In the case where a distal end part of the main pole is downsized more significantly than that defined in the condition of the illustration with advancement of higher density, a relative rate of the nonmagnetic layer 51 to the main pole distal end face increases in the conventional laminate technique, thus making more significant the lowering of the recording field intensity due to insertion of the nonmagnetic material or antiferromagnetic material.

Therefore, it can be said that the laminate structure of the main pole according to the present invention is more effective for higher density. There is no need for the ferromagnetic layer, the nonmagnetic layer, and the antiferromagnetic layer described above to be always in parallel to the opposite face 1a. For example, these layers may be inclined along a side face of a preformed groove or a hole or may be formed in a curved shape in a process for manufacturing the main pole in accordance with the second manufacturing method described above. Of course, in this case as well, the nonmagnetic layer or the antiferromagnetic layer does not appear on the distal end face of the main pole exposed on the opposite face described above. In addition, in the main pole, the demagnetizing field in a direction distant from the opposite face described above changes depending on the height (position) in the same direction. When the laminate film is formed in the direction distant from the opposite face, the laminate cycle is changed in consideration of this demagnetizing field, whereby obtaining of high head efficiency and magnetic domain control of the main pole can be compatible with each other. This advantageous effect can be expected by applying the laminate film to the magnetic recording head structure according to the present invention.

The present invention is not limited to the embodiments described above. At the stage of carrying out the invention, the present invention can be embodied by modifying constituent elements without departing from the spirit of the invention. In addition, a variety of inventions can be formed by using a proper combination of a plurality of constituent elements disclosed in the embodiments described above. For example, some constituent elements may be removed from all the constituent elements presented in the embodiments described above. Further, constituent elements presented in the different embodiments may be properly combined with each other.

For example, while the foregoing embodiments have described a case in which inclinations are provided on all the side faces of the main pole 2, a side face at the leading side in the down-track direction of the main pole 2 and an end face of the shield yoke 4 opposite thereto may be vertical.

The thin film magnetic recording head according to the present invention has the configuration and function described above. Thus, steep and strong recording field can be formed and recording density can be enhanced.

What is claimed is:

1. A thin film magnetic recording head, comprising:
   an opposite face opposite to a recording track of a magnetic recording medium;
   a main pole having a distal end exposed to the opposite face;
   a shield yoke extending the opposite face, and provided in a non-contact state via a predetermined gap on the main pole; and
   a coil to form a recording field which is generated at the magnetic recording medium from a distal end of the main pole; the main pole, the shield yoke, and the coil being formed to be substantially in parallel to the opposite face,
   wherein, in the vicinity of the distal end of the main pole, side faces at both ends in a widthwise direction of the recording track and a side face of at least one end in the recording track direction are inclined outwardly in a direction distant from the distal end.

2. The thin film magnetic recording head according to claim 1, wherein an end face of the shield yoke opposite to at least three inclined side faces of the main pole is inclined to be substantially parallel to the opposite side faces.

3. The thin film magnetic recording head according to claim 2, further comprising a return yoke which is formed at a proximal side distant from the opposite face of the main pole, and configures a magnetic circuit together with the main pole, the shield yoke, and a soft magnetic layer of the magnetic recording medium.

4. The thin film magnetic head according to claim 3, wherein the return yoke is provided with respect to the opposite face to be distant with at least a distance that is longer than thickness thereof.

5. The thin film magnetic recording head according to claim 3, wherein the return yoke is electrically connected to the coil to supply power thereto.

6. The thin film magnetic recording head according to claim 5, wherein the return yoke is provided via a gap with respect to a proximal end of the main pole.

7. The thin film magnetic recording head according to claim 6, wherein a high resistance magnetic material having a resistance value of at least several k$\Omega$ is interposed in the gap.

8. The thin film magnetic recording head according to claim 1, wherein an end face of the shield yoke opposite to at least three inclined side faces of the main pole is inclined in a direction distant from the opposite side faces.

9. The thin film magnetic recording head according to claim 1, wherein the main pole has a structure in which a first layer including at least one of a nonmagnetic material and an antiferromagnetic material and a second layer including a ferromagnetic material are alternately laminated in a direction distant from the opposite face, and the second layer is disposed at a distal end of the main pole.

* * * * *